(12) United States Patent
McKeown et al.

(10) Patent No.: US 10,934,673 B2
(45) Date of Patent: Mar. 2, 2021

(54) METHOD AND SYSTEM FOR APPLYING, RECOVERING AND RECYCLING AIRFIELD DE-ICING CHEMICALS

(71) Applicant: EAGLE AEROSPACE, LTD., Campbellford (CA)

(72) Inventors: Stephen Lyle McKeown, Campbellford (CA); Samuel McKeown, Campbellford (CA); Paul Edward Cudmore, Castleton (CA); Ty Shattuck, Burlington (CA); Daniel Thomas Savery, Hastings (CA)

(73) Assignee: EAGLE AEROSPACE LTD, Campbellford (CA)

( * ) Notice: Subject to any disclaimer, the term of this patent is extended or adjusted under 35 U.S.C. 154(b) by 0 days.

(21) Appl. No.: 16/762,656

(22) PCT Filed: Nov. 9, 2018

(86) PCT No.: PCT/CA2018/051424
§ 371 (c)(1),
(2) Date: May 8, 2020

(87) PCT Pub. No.: WO2019/090433
PCT Pub. Date: May 16, 2019

(65) Prior Publication Data
US 2020/0385944 A1 Dec. 10, 2020

Related U.S. Application Data

(60) Provisional application No. 62/584,182, filed on Nov. 10, 2017.

(51) Int. Cl.
*E01H 10/00* (2006.01)
*B05B 12/12* (2006.01)
(Continued)

(52) U.S. Cl.
CPC ......... *E01H 10/007* (2013.01); *B05B 12/122* (2013.01); *B05B 14/30* (2018.02); *B60R 1/0602* (2013.01); *E01H 5/04* (2013.01)

(58) Field of Classification Search
CPC ......... E01H 10/007; E01H 5/04; B05B 14/30; B05B 12/122; B60R 1/0602
(Continued)

(56) References Cited

U.S. PATENT DOCUMENTS 5,857,646 A * 1/1999 Taricco ..................... B64F 5/20
244/134 R
2009/0277770 A1 * 11/2009 Malatesta ................ B01D 3/06
203/3

(Continued)

FOREIGN PATENT DOCUMENTS

| CA | 2090454 A1 | 12/1992 |
|---|---|---|
| CA | 2107619 A1 | 4/1995 |

(Continued)

OTHER PUBLICATIONS

International Search Report dated Feb. 19, 2019 for corresponding International Application No. PCT/CA2018/051424.
(Continued)

*Primary Examiner* — Kerri L McNally
(74) *Attorney, Agent, or Firm* — Pearne & Gordon LLP

(57) ABSTRACT

A system for applying and recovering de-icing chemicals from a surface. The system includes a spray system for applying a de-icing chemical to the surface and draws the de-icing chemical from the surface. The de-icing chemical and contaminants are conveyed to a reservoir to form a combined solution. A recovery system includes a filter device for removing solids from the combined solution, at least one sensor for measuring a property of the combined solution, and a source of additive chemical. A controller is
(Continued)

configured to determine a property of the combined solution based on signals provided by the at least one sensor, move a valve to an open position to cause the additive chemical to mix with the combined solution if the property is less than a predetermined minimum value, and move the valve to a closed position if the property is greater than the predetermined minimum value.

12 Claims, 1 Drawing Sheet

(51) Int. Cl.
*B05B 14/30* (2018.01)
*E01H 5/04* (2006.01)
*B60R 1/06* (2006.01)

(58) Field of Classification Search
USPC .......................................................... 340/580
See application file for complete search history.

(56) References Cited

U.S. PATENT DOCUMENTS

2016/0053452 A1 2/2016 Treglown
2017/0267617 A1* 9/2017 Lepine .................... C07C 29/80

FOREIGN PATENT DOCUMENTS

CA 2176925 A1 6/1995
CA 2188935 A1 11/1995

OTHER PUBLICATIONS

Written Opinion dated Feb. 19, 2019 for corresponding International Application No. PCT/CA2018/051424.

* cited by examiner

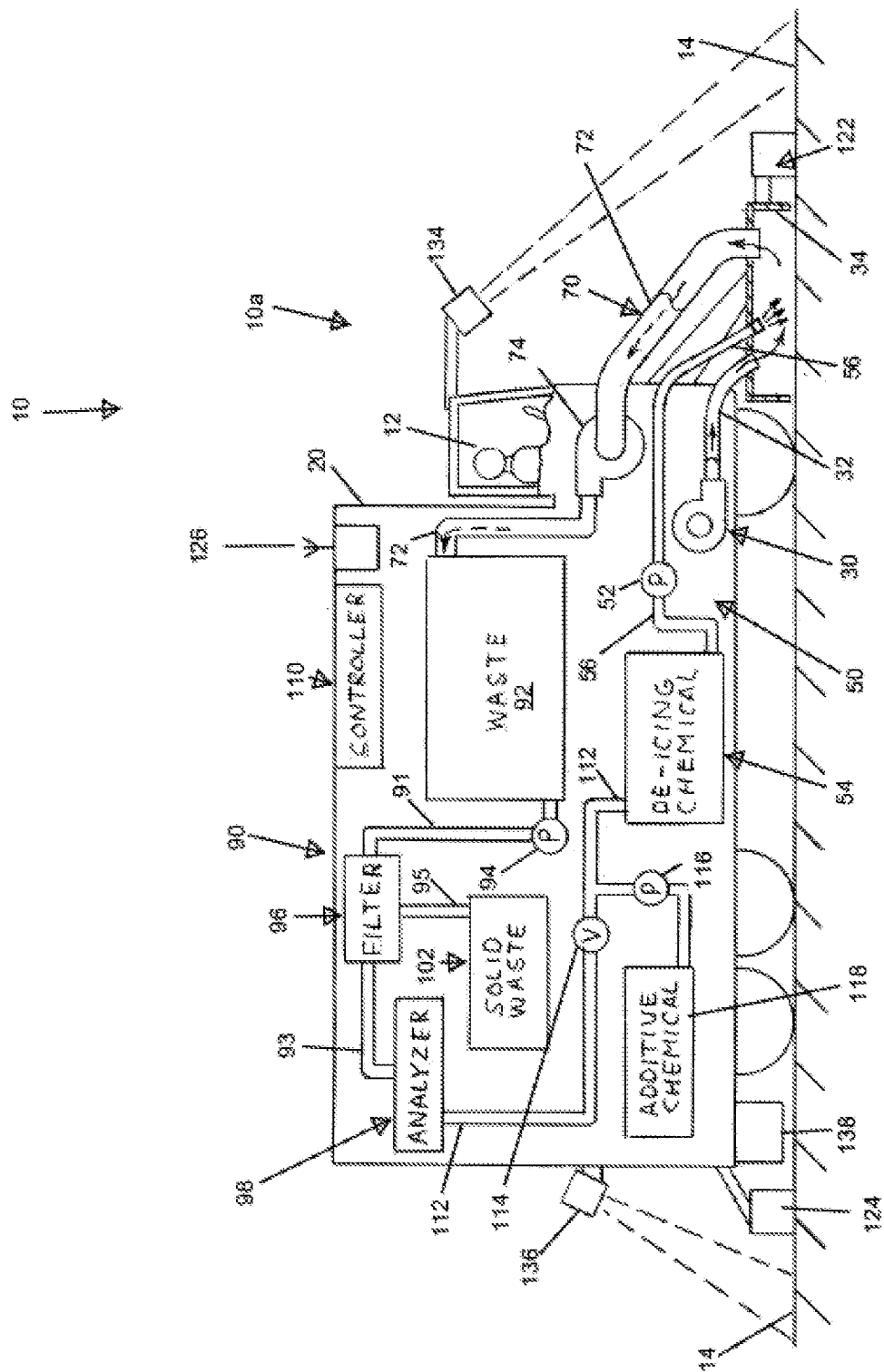

METHOD AND SYSTEM FOR APPLYING, RECOVERING AND RECYCLING AIRFIELD DE-ICING CHEMICALS

FIELD

The application relates to an apparatus for cleaning a surface, in particular, a vehicle for monitoring the conditions of a pavement and removing materials, including melted water, chemicals, and foreign objects from a surface of the pavement.

BACKGROUND

Conventionally, it has been shown to be very difficult to obtain and maintain a pavement in optimal conditions during winter storm conditions. In particular, it is difficult to maintain optimal the pavement in a condition that allows a vehicle moving on the surface to obtain optimal accelerations, braking and directional stability. Winter contaminants (like snow, slush, ice, freezing rain and water) may experience a change of state and/or a physical change (i.e., bonding or unbonding from pavements or each other, or, e.g., like wet compliant snow changing to compacted snow from events like vehicle or aircraft tracking). It is often difficult to maintain the surface at optimal conditions given the foregoing changes.

It is of utmost importance that airports be able to quickly and efficiently remove winter contaminants. Any loss of aircraft or vehicle braking or traction control can quickly result in an unsafe condition for passengers in the planes or aircraft, and for workers on the ground.

One conventional method to mitigate loss of traction or braking availability is to apply de-icing chemicals. The de-icing chemicals lower the freezing point of the winter contaminants to a temperature that is below the ambient temperature. As a result, the contaminants melt, or liquefy, which results in wet surfaces. These wet surfaces tend to provide better traction control for vehicles and aircraft.

Most of the de-icing chemicals currently applied at airports are alkali based. However, these harsh chemicals, when they come in contact with the landing gear and braking systems of aircraft, often cause billions of dollars of damage. In particular, the chemicals accelerate the catalytic oxidation of the carbon brakes in the landing gear systems.

The present invention provides a method and system for monitoring the conditions of a pavement and removing materials, including melted water, chemicals and foreign objects from a surface of the pavement.

SUMMARY

In accordance with one aspect of the present invention, there is provided a system for applying and recovering de-icing chemicals from a surface. The system includes a spray system for applying a de-icing chemical to a surface A vacuum system draws the de-icing chemical and contaminants from the surface and conveys the de-icing chemical and the contaminants to a reservoir to form a combined solution. A recovery system treats the combined solution. The recovery system includes a filter device for removing solids from the combined solution, at least one sensor for measuring a property of the combined solution, and a source of de-icing chemicals. A controller is configured to determine a property of the combined solution based on signals provided by the at least one sensor, move a valve to an open position to cause an additive chemical to mix with the combined solution if the property is less than a predetermined minimum value, and move the valve to a closed position if the property is greater than the predetermined minimum value. A sensing and monitoring system is provided for measuring a presence and/or absence of contaminants and a condition of the surface before the de-icing chemical is applied by the spray system and after the vacuum system draws the de-icing chemical and contaminants from the surface.

It is contemplated that the foregoing system may be configured such that the property measured by the at least one sensor is at least one of a concentration, a composition or acidity/alkalinity level of the de-icing chemical in the combined solution.

The system may also be configured such that the contaminants are at least one of snow, ice, foreign debris, de-icing chemical or water.

It is contemplated that the system may include an air blower for supplying pressurized air to blow the de-icing chemicals and the contaminants into the vacuum system.

It is contemplated that the aforementioned sensing and monitoring system may include: a first sensor configured for determining a presence and/or absence of contaminants on the surface before the de-icing chemical is applied by the spray system; a second sensor configured for determining a presence and/or absence of contaminants on the surface after the vacuum system draws the de-icing chemical and contaminants from the surface; a first friction device configured for determining a first friction value of the surface before the de-icing chemical is applied by the spray system; and a second friction device configured for determining a second friction value of the surface after the vacuum system draws the de-icing chemical and contaminants from the surface.

It is contemplated that the controller in the foregoing system may be configured to control the spray system, the vacuum system and the recovery system based on signals provided by the first sensor, the second sensor, the first friction device and the second friction device.

It is further contemplated that the first sensor and the second sensor may be ice detection sensors and the first friction device and the second friction device may be friction testing apparatuses.

It is contemplated that the aforementioned system may be configured such that some of the chemicals applied will be absorbed by the pavement during this process and will remain and perform anti-icing in preventing initial strong bonding of any new or continuing winter precipitation to the pavement.

In accordance with another aspect of the present invention, there is provided a method for applying and recovering de-icing chemicals from a surface, the method including steps of: applying a de-icing chemical to a surface; drawing the de-icing chemical and contaminants from the surface and conveying the de-icing chemical and the contaminants to a reservoir to form a combined solution; and treating the combined solution. The step of treating including; removing solids from the combined solution, measuring a property of the combined solution, determining a property of the combined solution, and adding an additive chemical to the combined solution when the property is less than a predetermined minimum value; determining a presence and/or absence of contaminants and a condition of the surface before the de-icing chemical is applied to the surface after the de-icing chemical and contaminants are drawn from the surface. The method includes a step of adjusting the steps of applying a de-icing chemical to a surface, drawing the de-icing chemical from the surface and treating the combined solution based on the step of determining a presence and/or absence of contaminants and a condition of the surface.

It is contemplated that in the foregoing method, the step of measuring a property may include measuring at least one of a concentration, a composition or acidity/alkalinity level of the de-icing chemical in the combined solution.

In the foregoing method, the contaminants may be at least one of snow, ice, foreign debris or water.

In the foregoing method, the step of applying a de-icing chemical to the surface may include supplying pressurized air to blow the de-icing chemicals and the contaminants into a vacuum system.

It is contemplated that, in the foregoing method, the step of determining a presence and/or absence of contaminants and a condition of the surface may include: determining a presence and/or absence of contaminants on the surface before the step of applying de-icing chemical, determining a presence and/or absence of contaminants on the surface after the step of drawing the de-icing chemical and contaminants from the surface; determining a first friction value of the surface before the step of applying the de-icing chemical; and determining a second friction value of the surface after the step of drawing the de-icing chemical and contaminants.

BRIEF DESCRIPTION OF THE DRAWINGS

The FIGURE shows an embodiment of a vehicle for adding and removing materials for a surface of pavement, according to one embodiment of the present invention.

DETAILED DESCRIPTION

It is contemplated that the apparatus described in detail herein may reduce the amount of the exposure of components of an aircraft, i.e., aircraft gear to de-icing chemicals. By reducing the quantity of chemicals applied to a surface the present apparatus may help to reduce the effects of catalytic oxidation on susceptible aircraft gear. Apparatuses known heretofore passively apply de-icing chemicals to a surface and then allow both the chemicals and a meltwater to remain on the pavement only to be splashed or drawn into the aircraft gear, and drain from the pavement to the unpaved pavement edges. In contrast, the present apparatus may provide high energy (higher pressure, and/or higher velocity, and/or higher volume) introduction of the de-icing chemicals to the contaminant on the surface (e.g., snow, ice, etc.) to break up and quickly melt the compacted snow/ice. Simultaneously, the present apparatus may allow for recovering, at a high efficiency, the diluted de-icing chemicals, any contaminants and melted winter contaminants.

Referring to the FIGURE, a recovery apparatus 10, according to the present invention, is shown. The recovery apparatus 10, in general, includes a housing 20, an air blower 30, a high-pressure de-icing spray system 50, a vacuum system 70, a waste recovery system 90 and a controller 110. In the embodiment shown, the housing 20 is part of a vehicle that is controlled by an operator 12 for cleaning a surface 14, e.g., a runway of an airport wherein the air blower 30, the high-pressure de-icing spray system 50 and the vacuum system 70 are disposed in the housing 11. The vacuum system 70 may be separate, or be the negative pressure inlet for the air blower 30. In other words, in the embodiment shown the air blower 30 and the vacuum system 70 are shown as separate systems. It is contemplated that the air blower 30 and the vacuum system 70 may be integrated into a single system (not shown), e.g., the air blower 30 may be defined by an outlet of a fan or blower and the vacuum system 70 may be defined by an inlet of the same fan or blower.

The air blower 30 may be configured to blow air in a predetermined direction and at a predetermined force against the surface 14 whereon the recovery apparatus 10 is moving. It is contemplated that the force that the air is blown against the surface 14 may be varied based on one or more of the following: a user input into the controller 110, the conditions of the surface 14, the speed of the recovery apparatus 10. In the embodiment shown, the air blower 30 is located towards a front 10a of the recovery apparatus 10. It is contemplated that the air blower 30 may be a fan or positive displacement air blower that is configured and designed to convey air onto the surface 14.

In the embodiment shown, an outlet of the air blower 30 is connected to a duct 32 that extends into a chamber 34. The chamber 34 includes an open bottom that faces the surface 14. Air exiting the outlet of the duct 32 is conveyed into the chamber 34 and towards the surface 14.

The high-pressure de-icing spray system 50, in general, includes a pump 52, and a reservoir 54 for holding de-icing chemicals. The reservoir 54 is configured to store a predetermined quantity of de-icing chemicals. A conduit 56 fluidly connects the reservoir 54 to the pump 52 and to the chamber 34. An outlet of the conduit 56 is positioned in the chamber 34 for conveying de-icing chemicals to the surface 14.

It is contemplated that the reservoir 54 may include one or more compartments wherein various de-icing chemicals are stored. In the embodiment shown, the outlet of the conduit 56 for the high-pressure de-icing spray system 50 is positioned adjacent the outlet of the duct 32 for the air blower 30. It is contemplated that the de-icing chemicals from the reservoir 54 and the air from the air blower 30 may be conveyed together or separately along the surface 14. It is also contemplated that the ratio of the de-icing chemicals to air may be continuously varied, based on detected conditions of the pavement (discussed in detail below).

In the embodiment shown the vacuum system 70 is positioned ahead (i.e. relatively further forward) of the outlet of the duct 32 for the air blower 30 and the conduit 56 of the de-icing spray system 50. The vacuum system 70, in general, includes a duct or conduit 72 that fluidly communicates with a waste storage tank/compartment 92 of the recovery system 90. A vacuum 74 draws air through the duct 72 and exhausts it into the waste storage tank/compartment 92.

The recovery system 90, in general, includes the waste storage tank/compartment 92, a pump 94, a filter 96, an analyzer 98, and a solid waste storage tank 102. The waste storage tank/compartment 92 is configured and dimensioned to receive a combined solution that is made up of a combination of the de-icing chemicals, melting snow and/or rain and the contaminants on the surface 14.

The pump 94 draws the combined solution from the waste tank 92 through the line 91 and conveys the combined solution through a filter 96 that separates the combined solution into solid waste and liquid waste. The solid waste is conveyed to the solid waste storage tank 102 where it is stored for later disposal.

The liquid waste continues in a line 93 out of the filter and is conveyed to the analyzer 98. Sensors in the analyzer 98, and in the reservoir 54, may be configured to monitor any one of a plurality of properties of the liquid waste and de-icing chemicals including but not limited to, a concentration of the de-icing chemicals, an acidity of the combined solution and a composition of the combined solutions.

After the liquid solution exits the analyzer 98 it is conveyed to through a line 112 and through a valve 114. Based on one or more of the foregoing properties sensed by the sensors in the analyzer 98 and the reservoir 54, the controller 120 selects the position of valve 114 such that the liquid waste either remains in the analyzer 98 or is passed to the reservoir 54. In the condition wherein the valve 114 allows liquid waste to flow through the line 112, the controller 110 causes a pump or conveyance system 116 to draw additive chemical from a storage tank 118. If the property measure by the sensors in the analyzer 98 and the reservoir 54 is not within a predetermined range, the controller 110 may be configured to cause the liquid waste to remain in the waste storage tank/compartment 92 for a time that is convenient.

It is also contemplated that in situations where there are more than one de-icing chemical in use, the sensors in the analyzer 98 and the reservoir 54 may be configured to analyze various other properties of the liquid waste In this embodiment, the controller 110 may be configured to cause pump 116 to draw the appropriate additive chemical from the tank 118 in the proper quantity to cause the measured property or properties to be in the desired range or ranges.

It is also contemplated that the present apparatus 10 may provide signals to an operator indicative of the conditions of the surface 14. In particular, the apparatus 10 may include friction testing apparatuses 122, 124 that extend a full width of the apparatus 10. A first friction testing apparatus 122 may be disposed in front of the vacuum system 70 for ascertaining the conditions of the surface 14 prior to treatment by the apparatus 10. A second friction testing apparatus 124 may be disposed behind the apparatus 10 for ascertaining the conditions of the surface 14 after treatment by the apparatus 10. The friction testing apparatuses 122, 124 may communicate directly with the operator 12 of the apparatus 10 and/or authorized parties of the aviation community via an antenna 126 to provide signals indicative of the pavement conditions both before being treated by the apparatus 10, and after treatment by the apparatus 10. Although the surface 14 that is cleared of matter is generally a pavement such as a runway of an airport, a road, or a sidewalk, the apparatus 10 may have applicability when used on unpaved or natural surfaces as well.

It is also contemplated that the present apparatus 10 may be configured to pick up foreign object debris (FOD) by air conveyance using the air blower 30, and ferrous metals by both air conveyance and magnetism using magnetic device 138. Although only a single magnet is shown in the FIGURE, it is contemplated that multiple magnetic devices 138 can be employed at various positions on the apparatus 10.

It is also contemplated that the present apparatus 10 may use the friction testing apparatuses 122, 124 and/or ice detection devices 134, 136 to ascertain both the requirements of the apparatus 10 and the effectiveness of the operation of the apparatus 10. The friction testing apparatuses 122, 124 and the ice detection devices 134, 136 may be part of a sensing and monitoring system that communicates with the controller 110 for providing signals indicative of the conditions of the surface 14 (e.g., the absence and/or presence of contaminants on the surface 14, a friction value for the surface 14, etc.) before and after the apparatus 10 passes over the surface 14.

It is also contemplated that the present apparatus 10 may provide condition information regarding the surface 14 for use on airport runways. The information may be reported to a pavement condition reporting team for eventual consideration in the forming of a NOTAM (Notice To Airmen) and an airport operations field condition report. For example, the apparatus 10 may be configured to monitor various external and internal conditions and/or performance via various sensors, and reports its effectiveness in completing this work. The monitored data can be stored digitally, and the reporting can likewise be done digitally. Preferably, the data is reported via a suitable wireless data transmission system, such as radio, Wifi, Bluetooth, cellular, or other such system.

As shown in the FIGURE, the apparatus 10 may be a vehicle propelled by an engine, a motor or the like, such as a truck, a tractor, a dozer, a cart, etc., or may be a vehicular device that is not self-propelled, such as a trailer, requiring a separate source of power for movement. Alternatively, the apparatus 10 may become a part of a vehicle through retrofitting. The example vehicle may be mobilized by wheels coupled to a power source, such as a drive engine. The vehicle may further include one or more auxiliary engine(s), or other motors (electric, hydraulic, pneumatic) that operate the various elements of the vehicle (pumps, sprayers, blowers, etc.).

The invention has been described with reference to the example embodiments described above. Modifications and alterations will occur to others upon a reading and understanding of this specification. Examples embodiments incorporating one or more aspects of the invention are intended to include all such modifications and alterations insofar as they come within the scope of the appended claims and their equivalents.

What is claimed is:

1. A system for applying and recovering de-icing chemicals from a surface, the system comprising:
    a spray system for applying a de-icing chemical to a surface;
    a vacuum system for drawing the de-icing chemical and contaminants from the surface, the vacuum system conveying the de-icing chemical and the contaminants to a reservoir to form a combined solution;
    a recovery system for treating the combined solution, the recovery system comprising;
        a filter device for removing solids from the combined solution,
        at least one sensor for measuring a property of the combined solution,
        a source of de-icing chemicals, and
        a controller configured to:
            determine a property of the combined solution based on signals provided by the at least one sensor,
            move a supply valve to an open position to cause additive chemical to mix with the combined solution if the property is less than a predetermined minimum value, and
            move the supply valve to a closed position if the property is greater than the predetermined minimum value; and
    a sensing and monitoring system for measuring a presence and/or absence of contaminants and a condition of the surface before the de-icing chemical is applied by the spray system and after the vacuum system draws the de-icing chemical and contaminants from the surface.

2. The system according to claim 1, wherein the property measured by the at least one sensor is at least one of a concentration, a composition or acidity/alkalinity level of the de-icing chemical in the combined solution.

3. The system according to claim 1, wherein the contaminants are at least one of snow, ice, foreign debris, de-icing chemical or water.

4. The system according to claim 1, further comprising:
an air blower for supplying pressurized air to blow the de-icing chemicals and the contaminants into the vacuum system.

5. The system according to claim 1, wherein the sensing and monitoring system includes:
a first sensor configured for determining a presence and/or absence of contaminants on the surface before the de-icing chemical is applied by the spray system;
a second sensor configured for determining a presence and/or absence of contaminants on the surface after the vacuum system draws the de-icing chemical and contaminants from the surface;
a first friction device configured for determining a first friction value of the surface before the de-icing chemical is applied by the spray system; and
a second friction device configured for determining a second friction value of the surface after the vacuum system draws the de-icing chemical and contaminants from the surface.

6. The system according to claim 5, wherein the controller is configured to control the spray system, the vacuum system and the recovery system based on signals provided by the first sensor, the second sensor, the first friction device and the second friction device.

7. The system according to claim 5, wherein the first sensor and the second sensor are ice detection sensors and the first friction device and the second friction device are friction testing apparatuses.

8. A method for applying and recovering de-icing chemicals from a surface, the method comprising steps of:
applying a de-icing chemical to a surface;
drawing the de-icing chemical and contaminants from the surface and conveying the de-icing chemical and the contaminants to a reservoir to form a combined solution;
treating the combined solution, the step of treating comprising;
removing solids from the combined solution,
measuring a property of the combined solution,
determining a property of the combined solution, and
adding an additive chemical to the combined solution when the property is less than a predetermined minimum value;
determining a presence and/or absence of contaminants and a condition of the surface before the de-icing chemical is applied to the surface after the de-icing chemical and contaminants are drawn from the surface; and
adjusting said steps of applying a de-icing chemical to a surface, drawing the de-icing chemical from the surface and treating the combined solution based on said step of determining a presence and/or absence of contaminants and a condition of the surface.

9. The method according to claim 8, wherein the step of measuring a property includes measuring at least one of a concentration, a composition or acidity/alkalinity level of the de-icing chemical in the combined solution.

10. The method according to claim 8, wherein the contaminants are at least one of snow, ice, foreign debris, de-icing chemical or water.

11. The method according to claim 8, wherein the step of applying a de-icing chemical to the surface includes supplying pressurized air to blow the de-icing chemicals and the contaminants into a vacuum system.

12. The method according to claim 8, wherein the step of determining a presence and/or absence of contaminants and a condition of the surface includes:
determining a presence and/or absence of contaminants on the surface before the step of applying de-icing chemical;
determining a presence and/or absence of contaminants on the surface after the step of drawing the de-icing chemical and contaminants;
determining a first friction value of the surface before the step of applying the de-icing chemical; and
determining a second friction value of the surface after the step of drawing the de-icing chemical and contaminants.

* * * * *